(12) United States Patent
Lunteren

(10) Patent No.: US 6,782,382 B2
(45) Date of Patent: Aug. 24, 2004

(54) PREFIX SEARCH METHOD AND DATA STRUCTURE USING COMPRESSED SEARCH TABLES

(75) Inventor: Jan Van Lunteren, Adiswil (CH)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 09/801,026

(22) Filed: Mar. 7, 2001

(65) Prior Publication Data

US 2002/0002549 A1 Jan. 3, 2002

(30) Foreign Application Priority Data

May 29, 2000 (EP) ............................................ 00810468

(51) Int. Cl.[7] .............................................. G06F 17/30
(52) U.S. Cl. ................................................ 707/3; 707/1
(58) Field of Search ........................................ 707/3, 1

(56) References Cited

U.S. PATENT DOCUMENTS

| | | | | |
|---|---|---|---|---|
| 5,276,868 A | * | 1/1994 | Poole ............................. | 707/3 |
| 5,813,001 A | | 9/1998 | Bennett .......................... | 707/3 |
| 5,946,679 A | * | 8/1999 | Ahuja et al. .................... | 707/3 |
| 6,014,659 A | * | 1/2000 | Wilkinson et al. .............. | 707/3 |
| 6,490,592 B1 | * | 12/2002 | St. Denis et al. ............. | 707/102 |

FOREIGN PATENT DOCUMENTS

| | | | | |
|---|---|---|---|---|
| EP | 0458698 | 5/1991 | ............ | G06F/15/40 |
| WO | 0022550 | 9/1999 | ............ | G06F/17/30 |

OTHER PUBLICATIONS

"An experimental study of compression methods for functional tries", Iivonen et al., Workshop on Algorithmic Aspects of Advanced Programming Languages, (WAAPL'99) Part of PLI'99, 1999, pp. 101–115.

* cited by examiner

Primary Examiner—Wayne Amsbury
Assistant Examiner—Cam-Linh T. Nguyen
(74) Attorney, Agent, or Firm—L. P. Herzberg; E. W. Petraske

(57) ABSTRACT

The invention relates to a system in which given search keys are evaluated, segment by segment, to search through tree-structured tables for finding an output information corresponding to the longest matching prefix. For at least one of the segments, only selected bits of the search key segment are used as index for accessing an associated table where test values are stored which are to be compared to the respective search key segment. The bits to be selected are determined by an index mask, reflecting the distribution of the valid test values in the table entries (and valid search key segment values). This allows table compression for minimizing storage requirements and search time. A procedure is disclosed for generating an optimum index mask in response to the set of valid test values.

3 Claims, 9 Drawing Sheets

(x = don't care)

PREFIX SEARCH METHOD AND DATA STRUCTURE USING COMPRESSED SEARCH TABLES

FIELD OF INVENTION

The present invention is related to the field of finding, in response to a given search key such as an IP address, an entry in a stored table for determining further handling or forwarding of an item carrying that search key. In particular, the invention is concerned with compressing stored tables and optimizing the search for entries in the tables matching the given search key.

BACKGROUND

Longest matching prefix (LPM) searches are widely used, in particular for routing packets in the Internet according to assigned IP addresses. Many solutions have been suggested for comparing leading search key bits (prefixes) against stored prefixes, and finding the longest matching prefix with its associated output route information (or next hop pointer) in a stored data structure. In particular, search trees have found application for longest matching prefix searching.

A very straightforward LPM search scheme consists of using the search key as an index into a table that contains the search result for every possible value of the search key.

FIG. 1 illustrates an example of this method applied for an IP version 4 forwarding in which the search key consists of the 32-bit IP destination address. In this example the routing table contains the following prefixes:

| | prefix | search result |
|---|---|---|
| 1) | 00010010001101000101011000110100b (12345634h) | -> A |
| 2) | 00010010001101000101011001111000b (12345678h) | -> B |
| 3) | 00010010001101000101011011001101b (123456CDh) | -> C |
| 4) | 101010111100110111110b (ABCDEh) | -> D |

The table contains $2^{32}$ entries, one entry for each possible value of the 32-bit IP destination address. All valid entries (i.e., entries that will result in a valid search result A, B, C or D) are shown in FIG. 1. All other entries are regarded as invalid and result in an invalid search result. Entries can be identified as valid or invalid for example using a bit flag.

The main disadvantage of this LPM scheme is its inefficient usage of a large amount of storage. As FIG. 1 shows, the table contains $2^{32}$ entries from which only a few are valid entries containing actual information related to the stored prefixes. A second disadvantage is that information related to a short prefix is stored in multiple table entries, which requires multiple memory accesses for insertion and removal of that prefix. This is the case with the fourth prefix (ABCDEh) that covers $2^{12}$=4096 table entries (ABCDE000h to ABCDEFFFh) in FIG. 1.

These two disadvantages can be reduced by converting the single table that is indexed by the entire search key, into a treelike structure of multiple linked tables that are indexed by smaller parts of the search key. This approach has been described by Gupta et al. ("Routing Lookups in Hardware at Memory Access Speeds.", Pankaj Gupta, Steven Lin, and Nick McKeown, IEEE Infocom April 1998, Vol 3, pp. 1240–1247, San Francisco) and Varghese et al. ("Fast address lookups using controlled prefix expansion.", V. Srinivasan and G. Varghese, ACM Trans. Comput. Syst. 17, 1, Feb. 1999, pp. 1–40).

FIG. 2 illustrates an example of applying such a concept on the data structure of FIG. 1. In FIG. 2 the search key is divided into three segments consisting of 16, 8 and 8 bits which are used to index the tables at the corresponding three levels as shown in FIG. 2. Each of these tables can contain valid and invalid entries, where a valid entry can contain a pointer to a table at the next level or a search result, and an invalid entry indicates an invalid search result.

The search operation starts with using the first segment as index into the table at level 1. If the indexed entry contains a pointer to a table at the next level, then this table will be indexed using the next segment. The search operation ends when an entry is indexed that contains a search result, which then will be the result of the search operation, or when an invalid entry is indexed in which case the result of the search operation will be an invalid result.

This is now illustrated for an IP destination address equal to '12345678h'. In FIG. 2 the first segment of this IP destination address equals '1234h' which is used as index into the table at level 1. This entry points to the lower table at level 2 in FIG. 2, which is indexed by the second segment of the IP destination address which equals '56h'. This entry points to the only table at level 3 in FIG. 2, which is then indexed using the third segment of the IP destination address which equals '78h'. This entry now provides the search result 'B'. The search results for the other prefixes are obtained in a similar way.

The data structure in FIG. 2 consists of 65536 table entries at level 1, 2*256=512 table entries at level 2, and 1*256 table entries at level 3, resulting in a total of 66304 table entries which is much less than the $2^{32}$ table entries of the data structure of FIG. 1. Although the entries in both figures might not be the same (e.g., the entries in FIG. 2 need to able to store a pointer together with an indication whether a pointer or a search result is stored), the data structure of FIG. 2 has clearly much less storage requirements than the data structure of FIG. 1. Furthermore, information related to a short prefix is stored in fewer table entries resulting in fewer memory accesses for update operations. For example, now the fourth prefix (ABCDEh) covers only 17 table entries (ABCDh in the table at level 1 and E0h to EFh in the upper table at level 2) instead of 4096 entries in the data structure of FIG. 1.

The scheme shown in FIG. 2 can require more memory accesses for a single search operation than the scheme shown in FIG. 1. However, if all tables belonging to the same level are stored in a separate independently accessible memory bank, then pipelining can be applied to obtain the same number lookups per time unit as the scheme shown in FIG. 2.

The actual storage requirements of the data structure in FIG. 2 are dependent on the number and sizes of the segments in the IP destination address and the prefixes stored in the data structure. Both McKeown and Varghese describe schemes with a fixed number of fixed-size segments (as shown in FIG. 2) as well as schemes with a variable number of variable-size segments. In the latter type of schemes, segment size information is embedded within the table entries that contain pointers to the tables at the next level. In this way, search operations for different IP destination addresses that take different paths through the data structure can involve a different number of segments that have different sizes. Consequently, the sizes of the tables at the same level can be different.

The schemes with a variable number of variable-size segments, allow a better optimization of the storage requirements of the data structure. However, the update function is much more complex, especially the support of incremental updates, and takes much more time. If the tables at the various levels are stored in separate memory banks to allow pipelining as mentioned above, then the update operation for a scheme with a variable number of variable-size segments could involve data movement between different banks when the update operation would change the segment sizes along a certain path through the data structure. This results in less efficient use of memory bandwidth, which is a critical resource in many search engines today, and consequently in decreased update performance. Another way to optimize the storage requirements is described in U.S. Pat. No. 5,781,772 (Wilkinson et al.). This patent describes a mechanism called pointer compression, which is applied on a fixed-size set of pointers in a node. The mechanism involves that the 'invalid' pointers (NIL-pointers) are removed from the node and that the location of the valid pointers (non-NIL-pointers) can be determined using a bit mask that is added to each node and that indicates which pointers are existing in a node (i.e., non-NIL-pointers). The same mechanism could be applied to a table as shown in FIG. 2. A similar method is described in U.S. Pat. No. 5,813,001 (Bennett).

This type of compression will work well for tables with a small number of entries. Larger tables require larger bit masks which will result in larger storage requirements and slower processing time during the search operation. A second disadvantage is that the resulting tables can have any size, not necessarily a power-of-2. This will make buffer management more complex, since buffer sizes that are not a power-of-2 are more difficult to manage efficiently.

SUMMARY OF THE INVENTION

It is an object of the invention to devise a method (and a data structure) for finding, in response to a given search key, a matching entry in a stored data structure, which allows improved searching by compressing data tables in response to the distribution of the data actually stored, and which provides an optimized procedure for the search operation. It is a further object to find a search method which allows the use of variable-length index values for table accessing individually and optimally selected from given search key segments.

The invention for achieving these objects is defined in the claims. It provides, in particular, the use of selected or masked-out bits of a fixed-length search key segment to access optimally compressed tables of test values to be compared to a given search key segment. In a particular embodiment, the invention provides an efficient procedure for generating an optimum index mask for the selection of bits from a search key segment. In a further particular embodiment, an additional prefix mask is provided for selecting only those bits of test values which are actually necessary for comparison to a given search key segment.

The main advantages of the invention are shorter search times and savings in storage space. Furthermore, due to the use of fixed-length search key segments (despite a variable number of search key bits actually used), updating of the stored tables is simplified. The possible incremental updating results in lower storage requirements. Further, due to the use of power-of-two buffer sizes, buffer management is simplified, and memory is more efficiently used.

In the following, an embodiment of the invention will be described with reference to the accompanying drawings.

DETAILED DESCRIPTION

Concept of Table Compression

Figure 2:
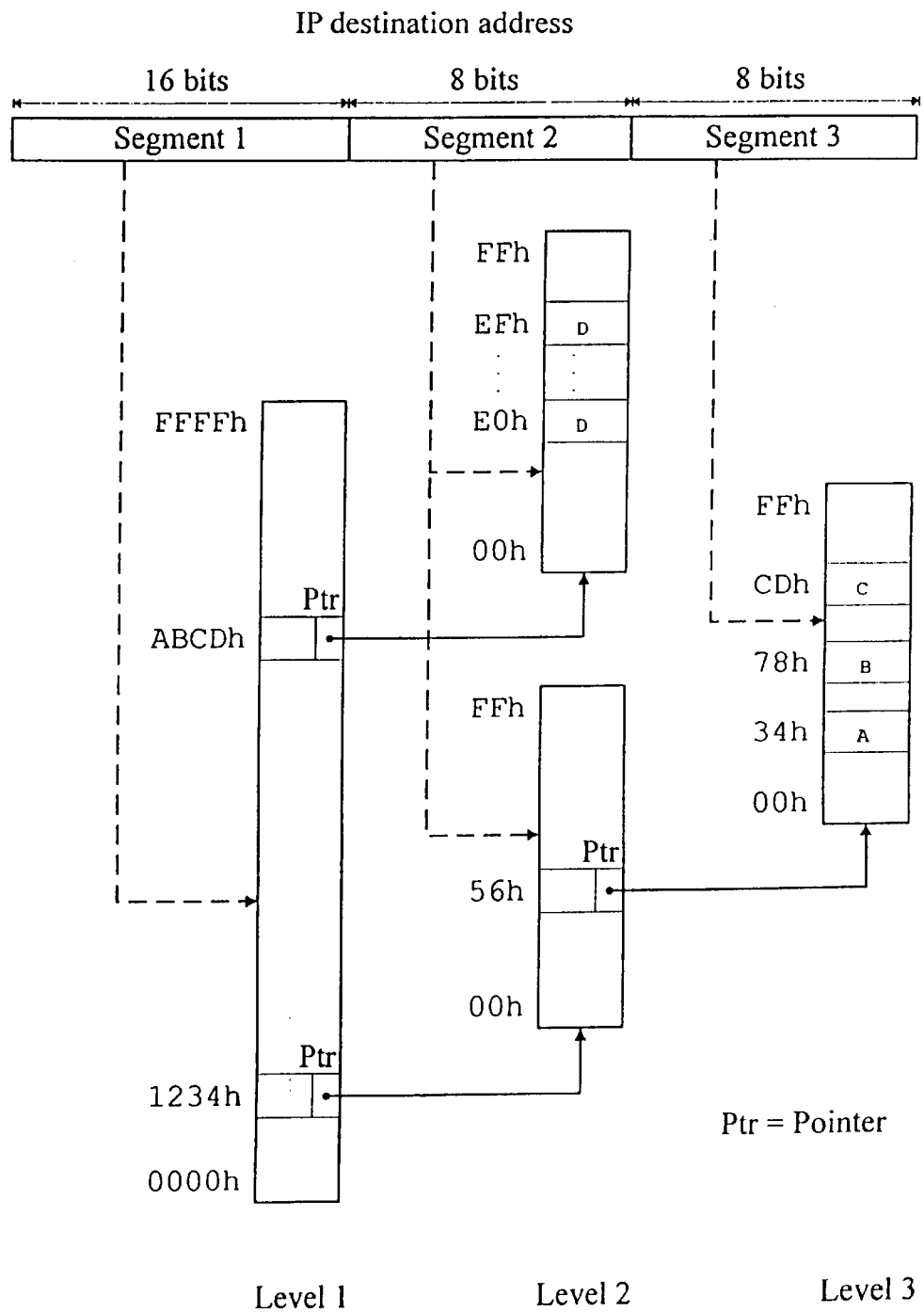
FIG. 2 illustrates a segmented search procedure with full lookup tables.

The presented invention involves a longest matching prefix search method that is based on a data structure that can be derived from data structures similar to the one shown in FIG. 2 by applying a compression on each individual table that occurs within these data structures.

Figure 3:
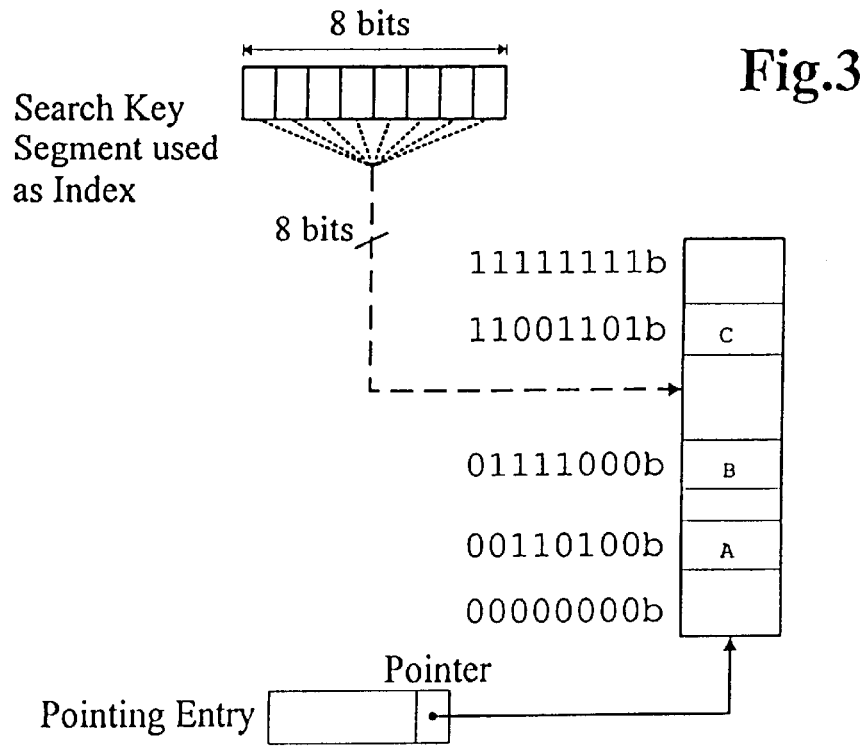
FIG. 3 shows a partial search using a search key segment as index into a table.
Figure 4:
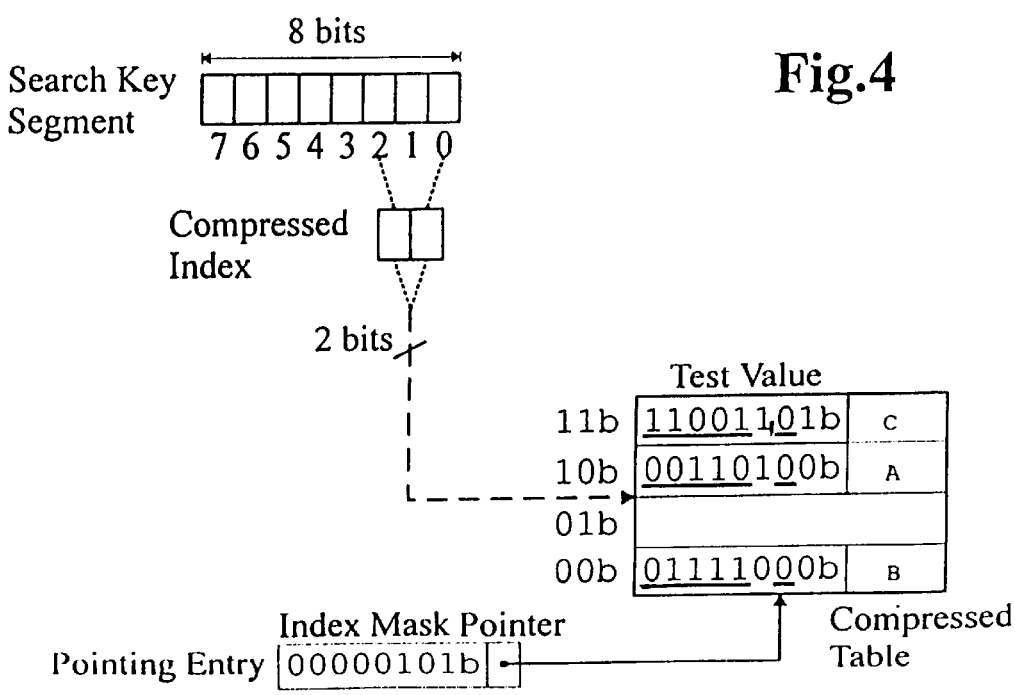
FIG. 4 is a basic illustration of the invention with a compressed lookup table and the use of selected bits of a search key segment as compressed index for accessing the compressed table, also showing an index mask for bit selection.

The principle of this compression is illustrated in FIG. 3 and FIG. 4. FIG. 3 shows again the table that was shown in FIG. 2 at level 3, now with binary index notation instead of hexadecimal for illustrative purposes. Since the third segment of the search key that is used to index the table consists of 8 bits as shown in FIG. 2 and 3, the respective table contains $2^8=256$ entries. From these entries, only three are valid at indices '34h', '78h' and 'CDh'. FIG. 3 also shows the entry in the table at level 2 in FIG. 2, that contains the pointer to the shown table, and which is denoted as pointing entry.

The table shown in FIG. 3 can now be compressed into the smaller table that is shown in FIG. 4 and which is indexed by a subset of the bits that constitute the search key segment that was used to index the original table. The index into the compressed table will be called compressed index. In FIG. 4 the compressed index consists of the bits at positions 0 and 2 within the search key segment. The bits that comprise the compressed index are indicated by a so called index mask that is stored (together with a pointer to the next table) in the pointing entry in a table at the previous level. If the compressed index consists of k bits then the compressed table will contain $2^k$ entries. In that case the index mask will contain k bits set to '1'. The compressed index has to be selected from the search key segment in such way that no two search key segment values corresponding to valid entries in the original table (i.e., no two indexes of valid entries in the original table) will result in the same compressed index.

As the compressed index is only a subset of the search key segment, there are multiple values of the search key segment that result in the same compressed index. For this reason the index operation is followed by a test operation against a test value that is stored in each entry in the compressed table and which specifies the value of the search key segment bits that are not part of the compressed index. If the test result is positive (i.e., the search key segment bits equal the test value) then the search operation continues based on the contents of the indexed entry. If the test result is negative then the search operation ends as if an invalid entry had been indexed.

For ease of implementation, this test value may also consist of the entire search key segment value including the compressed index bits. The test values that are shown in FIG. 4 consist of the entire search key segment value in which the bits that are not part of the compressed index and therefore need to be tested, are shown underlined.

Figure 5:
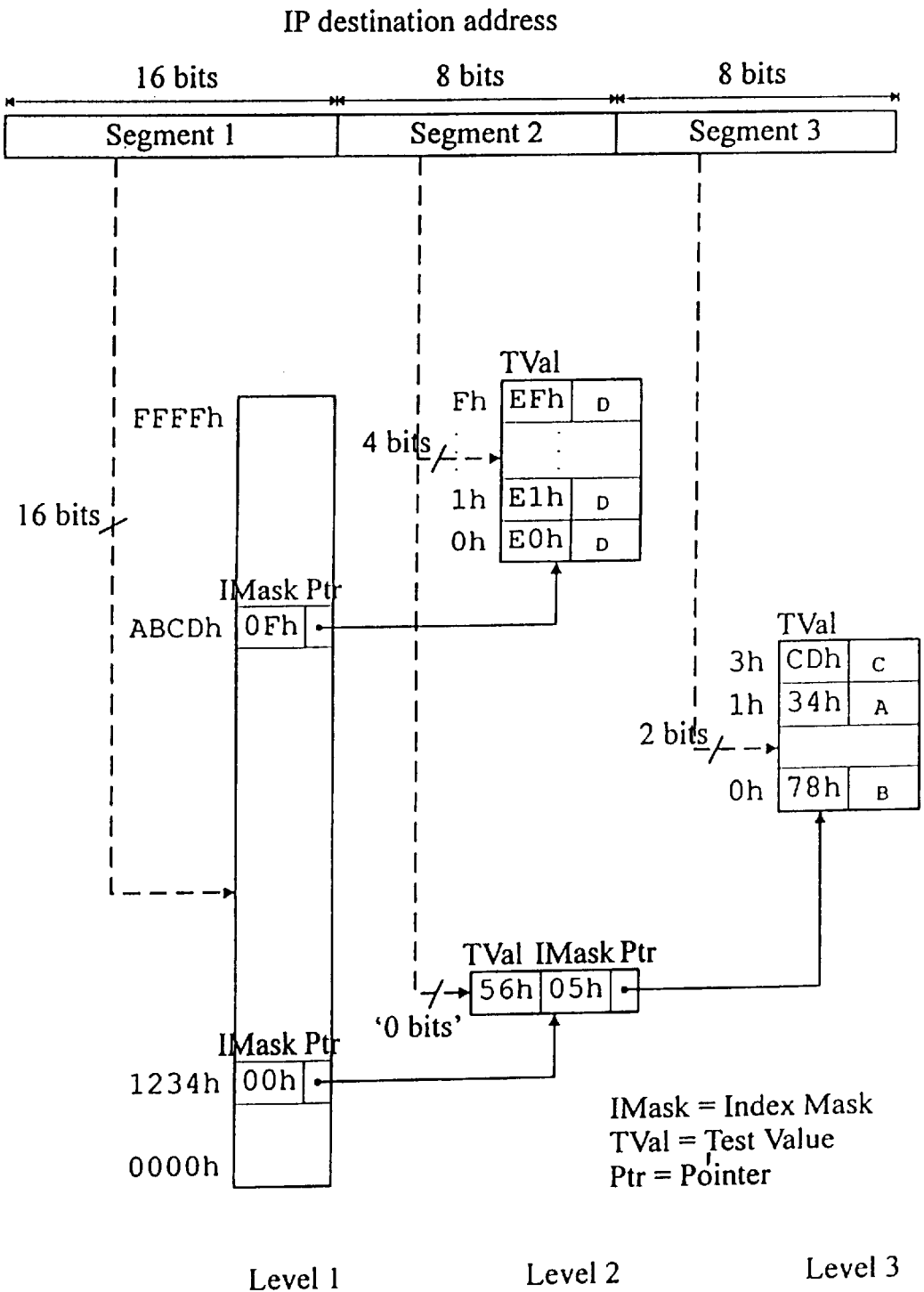
FIG. 5 shows a multilevel longest matching prefix search using index masks and compressed indexes in several selected stages of the search.

FIG. 5 shows the data structure of FIG. 2 in which the described table compression is applied on all tables except the table at level 1. In a typical system it is expected that the first segment that is used to index the table at level 1 will be relatively large compared to the other segments for search performance reasons. For update performance reasons it is probably better to leave this first table uncompressed, as the relatively large first segment size would result in a slower update operation for a compressed version (the update operation will be discussed below). FIG. 5 shows that the lower table at level 2 is compressed into a table with one single entry which will be always indexed (accessed) independent on the segment value as indicated by an Index Mask equal to '00h' in the corresponding pointing entry in the table at level 1. In order to keep the figure understandable, FIG. 5 only shows the sizes (0 bits/4 bits) of the compressed indices that are used to index the various tables, however, not the actual bits from which these compressed indices are comprised (these can be derived from the Index Masks shown in hexadecimal representation in FIG. 5).

Figure 6:
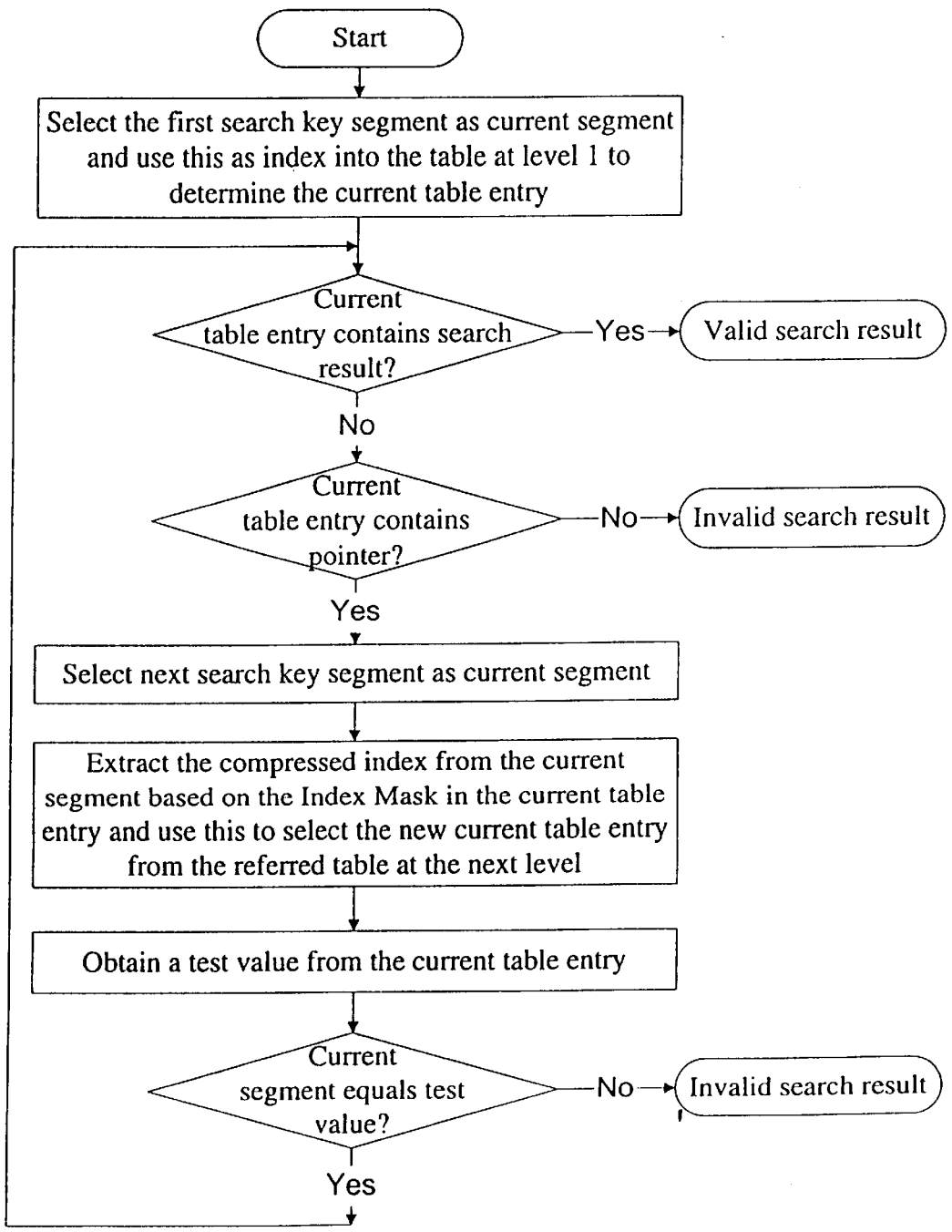
FIG. 6 is a flow diagram of a search procedure in the structure shown in FIG. 5.

FIG. 6 shows a flow diagram describing the various steps that have to be performed during a search operation based on a data structure as shown in FIG. 5.

Building and Updating a Compressed Data Structure

One way to build and update the compressed data structure is by maintaining an uncompressed data structure as well. This uncompressed data structure can be build and updated in the conventional way. All the tables that are affected in case of a build or update operation are first taken in the uncompressed form and can then be compressed and updated into the compressed data structure. In this way the complexity of building and updating the data structure is reduced to the complexity of compressing individual tables.

Compression of a table consists of the following two steps:

1) determine the index mask that is used to derive the compressed index,
2) build the compressed table based on the index mask and the original table contents.

The first step will now be discussed. The second step is straightforward.

Optimum Index Mask Generation

The largest compression is achieved with the smallest compressed index that satisfies the condition that no two valid entries in the original table are 'mapped' on the same compressed index value. The latter condition is satisfied if for each possible pair of two valid indices the compressed index includes at least one bit from the search key segment in which these indices are different.

In case only one valid index (table entry) exists, then the optimum index mask consists of all zero's (this is for example the case for the lower table at the second level in FIG. 5, for which the pointing entry in the table at the first level contains an index mask consisting of all zero's). For the case of multiple valid indices (table entries), a smallest compressed index, corresponding to an optimum index mask with a minimum number of bits set to one, can be determined in the following way.

1) For each pair of two valid indices (table entries), the bit positions are determined in which they are different. This can be done by determining bitwise XOR products for each pair of valid indices. Each of these XOR product contains a '1' bit at the bit positions in which the corresponding two indices are different.
2) Next all possible non-zero index masks (tentative index masks) are generated, ordered according to an increasing number of bits set to one. For each possible (tentative) index mask, bitwise AND products are determined with each of the XOR products that were determined in the first step. The first tentative index mask for which all these AND products will be non-zero will be selected as optimum index mask (if an index mask has a non-zero AND product with each XOR product, this means that the corresponding compressed index will contain at least one bit in which each pair of valid indices (table entries) is different—due to the order in which the possible index masks are generated, the first one found to fulfill the above condition will contain a minimum number of '1' bits).

This concept will be illustrated using the example that was shown in FIG. 3. In this example the valid indices (table entries) are:

index a) 00110100b
index b) 01111000b
index c) 11001101b

The XOR products of each possible combination of two of these indices are:

XOR product 1 (index a and index b): 01001100b
XOR product 2 (index a and index c): 11111001b
XOR product 3 (index b and index c): 10110101b The following table illustrates the index masks that are successively generated and the bitwise AND products of these index masks and the above XOR products. The index mask '00000101b' is the first index mask for which all AND products are non-zero. This index mask is then selected as optimum index mask (this is also the index mask used in FIG. 4).

|      |             | bitwise AND products with | | |
| ---- | ----------- | --------- | --------- | --------- |
| step | index masks | 01001100b | 11111001b | 10110101b |
| 1    | 00000001b   | 00000000b | 00000001b | 00000001b |
| 2    | 00000010b   | 00000000b | 00000000b | 00000000b |
| 3    | 00000100b   | 00000100b | 00000000b | 00000100b |
| 4    | 00001000b   | 00001000b | 00001000b | 00000000b |
| 5    | 00010000b   | 00000000b | 00010000b | 00010000b |
| 6    | 00100000b   | 00000000b | 00100000b | 00100000b |
| 7    | 01000000b   | 01000000b | 01000000b | 00000000b |
| 8    | 10000000b   | 00000000b | 10000000b | 10000000b |
| 9    | 00000011b   | 00000000b | 00000001b | 00000001b |
| 10   | 00000101b   | 00000100b | 00000001b | 00000101b |

XOR Product Bit Vector

For a segment size equal to 8 bits, the maximum number of different XOR products generated by pair-wise XOR combination of segment values (valid indices) equals 255 (an XOR product equal to zero is not possible since this would indicate an XOR product between two identical indices). If the number of valid indices (segment values) equals n, then the number of XOR products will equal (n-over-2). For n=24 or more valid indices, the number of XOR products will be greater than 256. As only 255 different XOR products are possible, this means that multiple pairs of indices (segment values) will result in the same XOR product.

Figure 1:
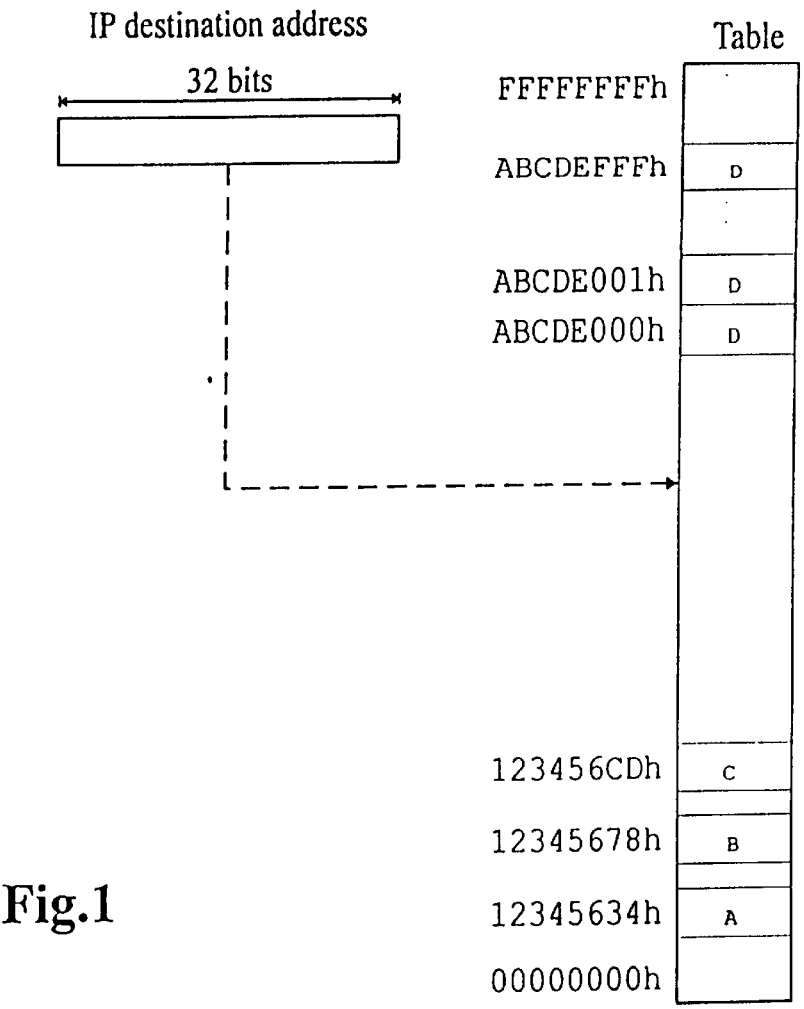
FIG. 1 shows a one-step full search procedure with a full search key.
Figure 7:
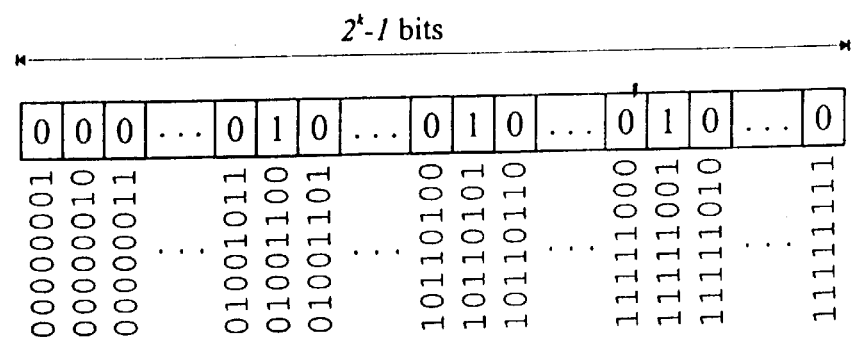
FIG. 7 illustrates an XOR product bit vector which can be used to save storage space and processing time during the generation of an optimum index mask.

Based on this observation, the presented invention involves also an efficient method to store a representation of all determined XOR products within a so called XOR product bit vector, instead of storing separate entries in a table or other data structure. For a segment size equal to k bits, the XOR product bit vector will contain $2^k-1$ bits which correspond to the possible XOR product values '00000001b', '00000010b', '00000011b', to '11111111b'. If a certain XOR product is generated then the corresponding bit in the bit vector is set. FIG. 7 shows the value of the XOR product bit vector for the three XOR products in the above example.

A possible implementation in the programming language "C" for determining all XOR products and determining the optimum index mask using the concept of a XOR product bit vector is given below.

part of the segment that is not covered consists of 4 bits. This is the reason that $2^4=16$ entries in the table at level 2 are needed to store information related to this prefix, since all possible values of these last 4 bits result in a valid index in the uncompressed table that was shown in FIG. 2. All these valid indices share the same first four bits which are actually the only relevant bits that relate to the prefix, and which are therefore the only bits that need to be tested against the stored test value.

Figure 9:
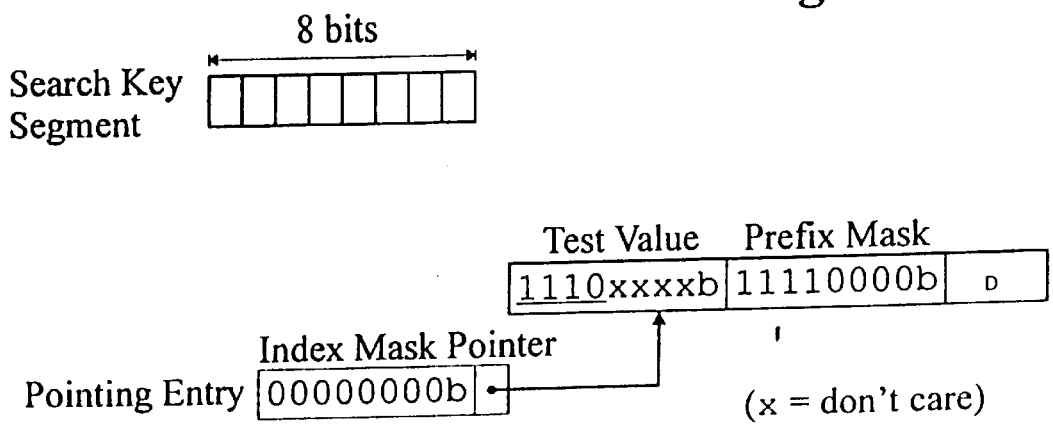
FIG. 9 illustrates the use of a prefix mask for the case of FIG. 8, for saving storage space and search time in the case of test values having identical portions.

Based on this observation, FIG. 9 now shows a way to further compress the table by storing a so called prefix mask with the test value to indicate which part of the test value needs to be tested against the segment value. As a consequence, only one table entry is needed instead of 16 separate table entries for all possible values of the last four bits of the segment. This corresponds to an index mask in the pointing entry equal to '00h' as shown. This shows that the calculation of an index mask has to be adapted as well, which will be discussed below.

Figure 10:
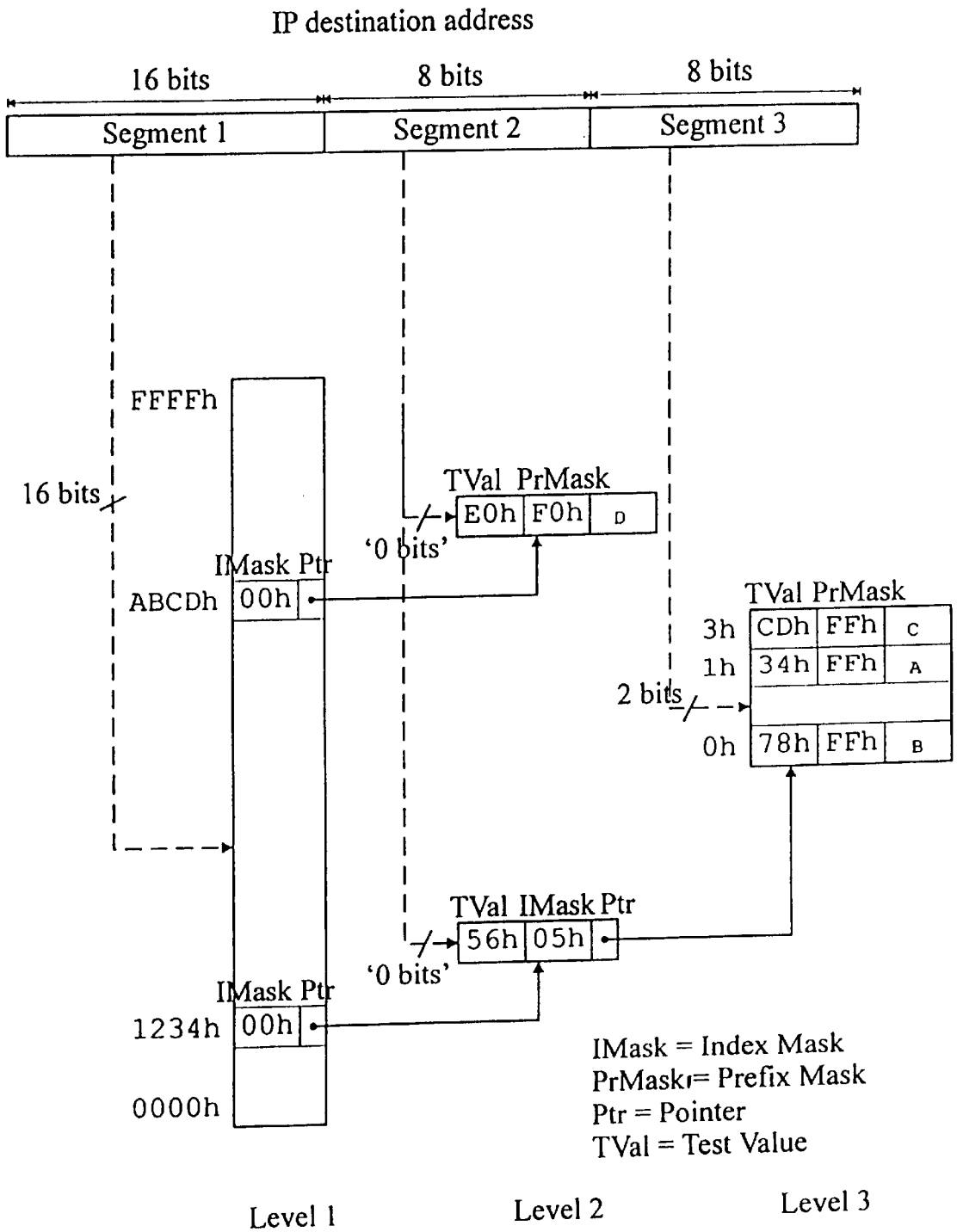
FIG. 10 illustrates a multistage search in compressed tables, using compressed indices generated by a bit mask, and additionally using prefix masks.

FIG. 10 shows the result of applying the concept of the prefix mask upon the example that was shown in FIG. 5. The prefix mask is only needed for table entries that contain a search result. For table entries containing a pointer to a table

```
unsigned char ValidIndex [];                                    /* array with valid indices    */
int Count;                                                      /* number of valid indices     */
            /* array with all possible index masks ordered                                     */
            /* according to increasing number of ones                                          */
unsigned char IndexMaskArray [255] =                    { 0x01,    /* 00000001b    */
                                                          0x02,    /* 00000010b    */
                                                          0x04,    /* 00000100b    */
                                                          ...,
                                                          0xFF } ; /* 1111111b     */
unsigned char Optimum_IndexMask;
unsigned char XOR_ProductBitVector [255] = { 0, 0, . . . , 0} ;
unsigned char XOR_Product;
unsigned char MaskFound;
int i, j;
/* determine XOR products */
for (i=0; i<Count-1;i++) {
   for (j=i+1;j<Count;j++) {
      XOR_Product = ValidIndex[i] ValidIndex[j];
      XOR_ProductBitVector [XOR_Product-1] = 1;
   }
}
/* determine optimum index mask */
MaskFound = 0;
for (i=0; (MaskFound == 0) ;i++) {
   MaskFound = 1;
   for (XOR_Product=1;XOR_Product<256;XOR_Product++) {
      if ((XOR_ProductBitVector [XOR_Product-1] ) &&
        ((IndexMaskArray[i] & XOR_Product)==0))
      MaskFound = 0;
   }
}
Optimum_IndexMask = IndexMaskArray [i];
```

Improved Compression

The upper table at the second level in FIG. 5, contains 16 entries that all relate to the same prefix 10101011100110111110b (ABCDEh)-> D.

Figure 8:
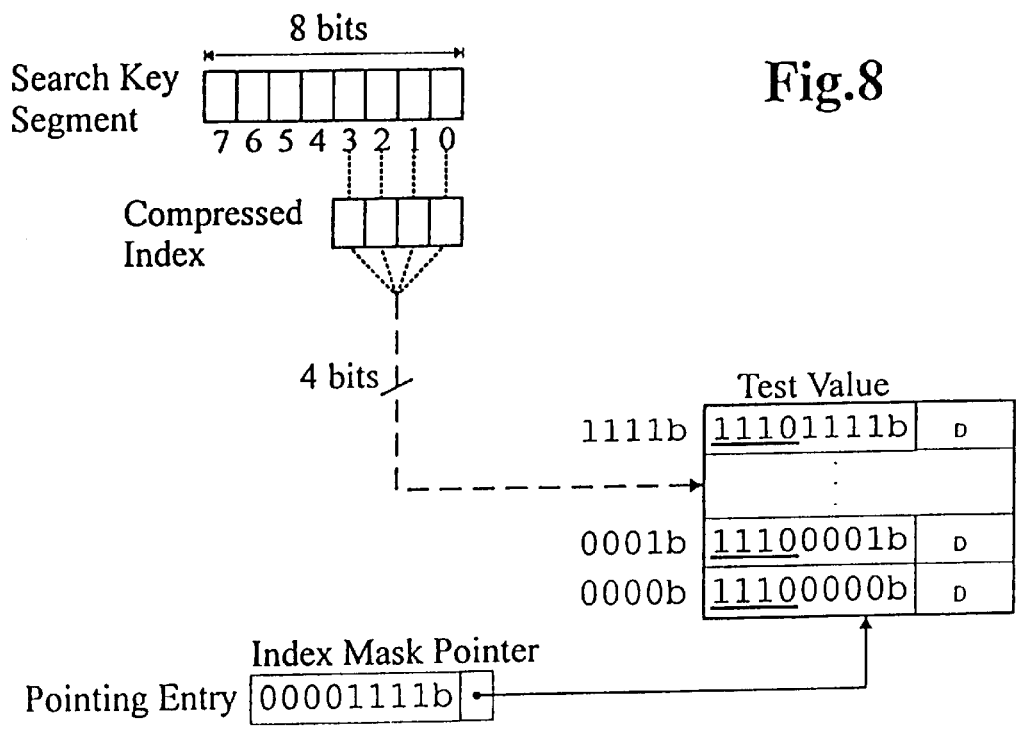
FIG. 8 shows a case of using a compressed index for accessing stored test values having a common portion.

This table is shown again in FIG. 8, now with binary index notation for illustrative purposes.

Figure 11:
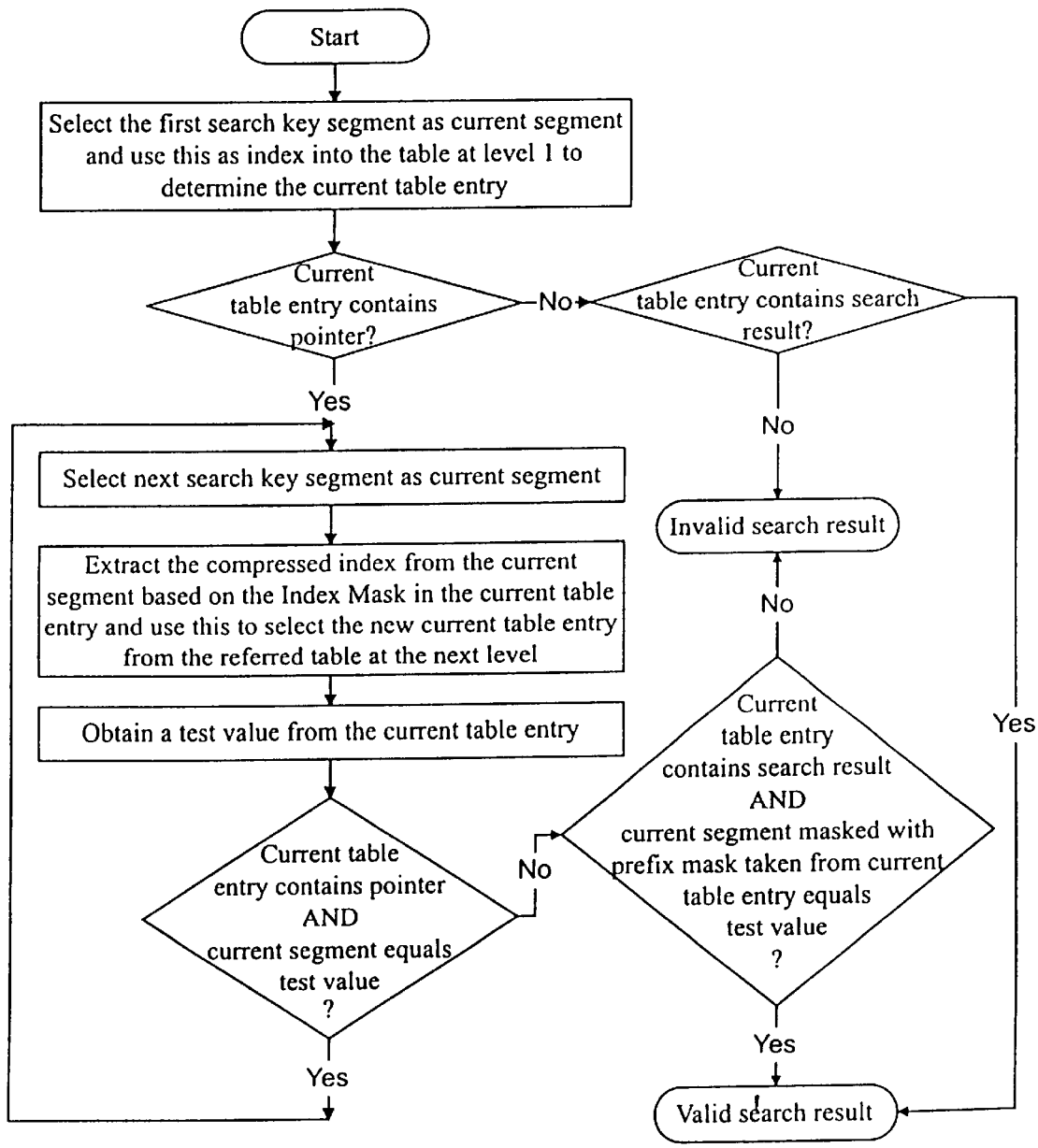
FIG. 11 is a flow diagram of a search procedure in a structure as shown in FIG. 11.

The prefix 'covers' (with the four bits representing the value E) only half of the search key segment from which the compressed index is derived that is shown in FIG. 8. The last at the next level which will be indexed by parts from the next segment, the entire current segment value is tested (this is the nature of longest matching prefix search). The three valid entries in the table at the third level in FIG. 10 all contain prefix masks 'FFh' indicating that the entire test value is relevant. FIG. 11 shows a flow diagram based on the flow diagram shown in FIG. 6, adapted to the concept of a prefix mask.

the nature of longest matching prefix search). The three valid Determining Optimum Index Mask for Improved Compression The optimum index mask generation for the improved compression scheme involves the following modifications to the original scheme for determining the compressed index.

1) Only the relevant parts of the valid indices as indicated by the corresponding prefix masks, should be used to determine the XOR product. If an XOR product equals zero for two valid indices that relate to different prefixes, then this means that one of these two prefixes is a prefix of the other prefix. In this case the XOR product of the prefix masks indicates a base set of bits that have to be set to one in the optimum index mask (this will be discussed below).
2) Only non-zero index masks are generated that have at least bits set to one for all the base sets of bits as mentioned above. Only the non-zero XOR products that were generated in the first step are evaluated. The rest of the procedure is the same An example with the following three prefixes will be used to illustrate how an optimum index mask can be determined for the improved compression method:

10101011110011011110b (ABCDEh)-> D.

10101011110011011111011b (ABCDECh)-> E.

10101011100110110101011b (ABCDABh)-> F.

Figure 12:
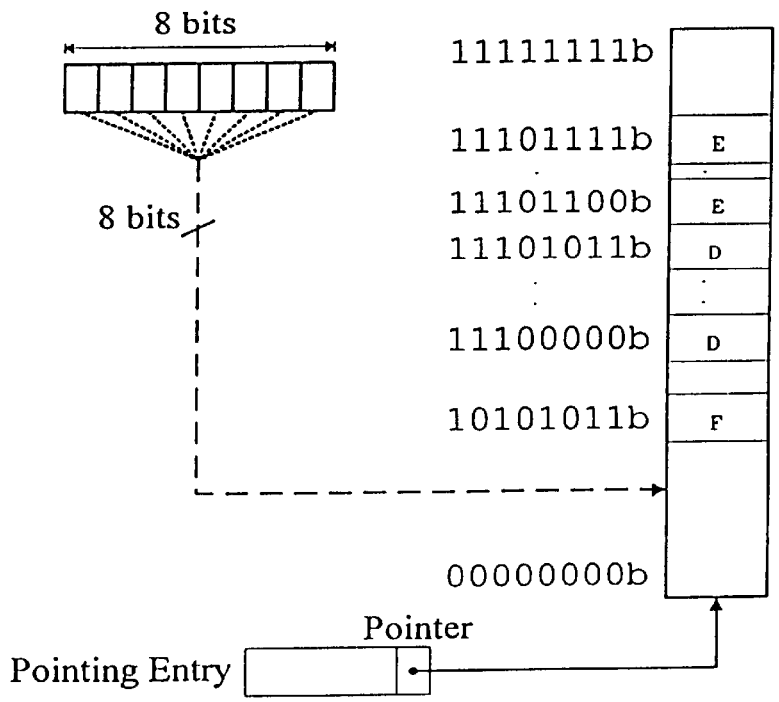
FIG. 12 shows an uncompressed table with relationships between index values allowing improved compression.

The first prefix was already present in the uncompressed data structure that was shown in FIG. 2. Adding the other two prefixes would only change the upper table at the second level in FIG. 2 into the uncompressed table that is shown in FIG. 12. In this example the first prefix is a prefix of the second prefix.

The relevant bits of the search key segment, and therefore of the valid indices in FIG. 12 are represented for the three prefixes by the following prefix masks:

| | valid indices | prefix mask | search result |
|---|---|---|---|
| index f) | 1110xxxxb | 11110000b | -> D |
| index g) | 111011xxb | 11111100b | -> E |
| index h) | 10101011b | 11111111b | -> F |
| (x = don't care) | | | |

The XOR products between the relevant bits of these valid indices as indicated by the corresponding prefix masks are:

XOR product 1 (index f and index g): 00000000b
XOR product 2 (index f and index h): 01000000b
XOR product 3 (index g and index h): 01000100b The first XOR product equals zero indicating a prefix of a prefix. Now the XOR product of the two prefix masks 11110000b and 11111100b corresponding to these valid indices f and g is taken resulting in: 00001100b. In the second step now only index masks are generated that have bits set to one at the same positions as this XOR product. This is shown in the table below:

| | | bitwise AND products with | |
|---|---|---|---|
| step | index masks | 01000000b | 01000100b |
| 1 | 00001100b | 00000000b | 00000100b |
| 2 | 00001101b | 00000000b | 00000100b |
| 3 | 00001110b | 00000000b | 00000100b |
| 4 | 00011100b | 00000000b | 00000100b |
| 5 | 00101100b | 00000000b | 00000100b |
| 6 | 01001100b | 01000000b | 01000100b |

Figure 13:
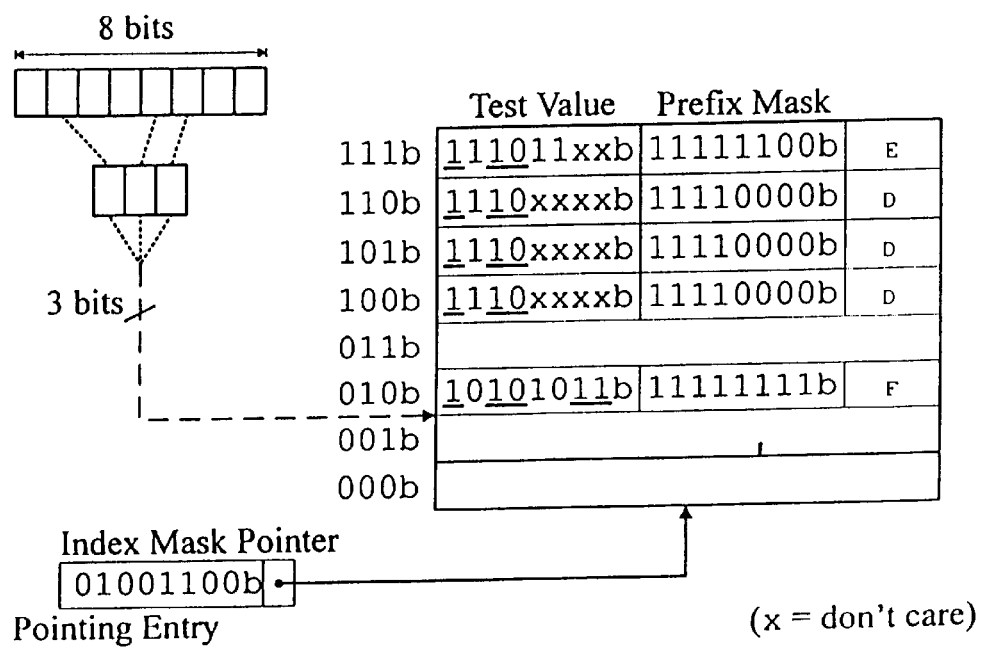
FIG. 13 illustrates a compressed search table for the case of FIG. 12, resulting from an improved compression method.

The first index mask resulting in non-zero bitwise AND products for both non-zero XOR products is 01001100b (step 6). This is the optimum index mask used in FIG. 13.

The original implementation in the programming language "C" can be modified in the following way to perform the compressed index generation described here.

```
unsigned char ValidIndex [];                                            /* array with valid indices     */
unsigned char PrefixMask [];                                            /* array with prefix masks      */
int Count;                                                              /* number of valid indices      */
            /* array with all possible index masks ordered               */
            /* according to increasing number of ones                    */
unsigned char IndexMaskArray[255] =                                     { 0x01,      /* 00000001b       */
                                                                          0x02,      /* 00000010b       */
                                                                          0x04,      /* 00000100b       */
                                                                          ...,
                                                                          0xFF };    /* 11111111b       */
unsigned char Base_IndexMask = 0;
unsigned char Optimum_IndexMask;
unsigned char XOR_ProductBitVector [255] = { 0, 0, . . . , 0};
unsigned char XOR_Product;
unsigned char MaskFound;
int i, j;
/* determine XOR products */
for (i=0; i<Count-1; i++) {
  for (j=i+1; j<Count; j++) {
    XOR_Product = (ValidIndex [i] ^ ValidIndex[j]) &
        PrefixMask [i] & PrefixMask [j];
    if (XOR_Product == 0)
      Base_IndexMask |= (PrefixMask [i] ^ PrefixMask[j]);
    else
      XOR_ProductBitVector [XOR_Product-1] = 1;
```

-continued

```
   }
  }
 }
/* determine optimum index mask */
MaskFound = 0;
for (i=0; (MaskFound == 0) ;i++) {
 if ((IndexMaskArray [i] & Base_IndexMask) == Base_indexMask) {
   MaskFound = 1;
   for (XOR_Product=1;XOR_Product<256;XOR_Product++) {
     if ((XOR_ProductBitVector [XOR_Product-1]) &&
       ((IndexMaskArray [i] & XOR_Product)==0)
      MaskFound = 0;
    }
   }
  }
 }
}
Optimum_IndexMask = IndexMaskArray [i];
```

The present invention may be implemented in the context of a fully functioning data processing system, and those of ordinary skill in the art will appreciate that the processes of the present invention are also capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. Method for determining an output information in response to an input search key, by a stepwise prefix search in a tree structured data base comprising stored tables, and by evaluating successive segments of the search key each of given length, comprising the steps of:

a) in at least one step for evaluating a search key segment, selected bits of the segment are used as compressed index for accessing a table of stored test values associated with that segment and b) the test value accessed by the compressed index is compared to at least the remaining portion of the search key segment evaluated, and the comparison result determines the further processing or the result of the search procedure; and c) generating pair-wise XOR products from all valid index values which can occur in the respective search key segment, and which correspond to the test values stored in the indexed table and from which bits are to be selected;

d) preparing sequentially tentative index masks each containing a total number of bits equal to the number of bits in the search key segment from which bits are to be selected, starting with a single 1-bit in each tentative index mask and proceeding to increasing numbers of 1-bits in the tentative index masks;

e) generating successively, for each of the tentative index masks prepared, the bitwise AND product between the respective tentative index mask and all of the XOR products previously generated in step (c); and f) ending the procedure when each of the AND products generated for a tentative index mask contains at least one 1-bit, and storing the respective tentative index mask as optimum index mask for the respective search key segment.

2. Method according to claim 1, comprising the following additional substep during step (c) when generating pair-wise XOR products for all valid index values which can occur in the respective search key segment, each containing k bits:

providing an XOR product bit vector comprising $2^k$ bit positions each assigned to one of the possible XOR products, and setting after generation of a particular XOR product the respective bit position in the XOR bit vector to 1, so that not all generated XOR products need to be stored until generation of the AND products in step (e).

3. Method according to claim 1, for updating the search data structure when a new valid test value and corresponding index value has to be inserted, comprising the step of newly calculating each index mask involved, on the basis of all valid index values, including the new one.

* * * * *